United States Patent
Zierer et al.

[11] Patent Number: 6,013,761
[45] Date of Patent: Jan. 11, 2000

[54] OXIDATION OF POLYARYLENE SULFIDES

[75] Inventors: Dirk Zierer, Hofheim; Helmut Scheckenbach, Langen, both of Germany

[73] Assignee: Ticona GmbH, Kelsterbach, Germany

[21] Appl. No.: 09/195,402

[22] Filed: Nov. 19, 1998

[30] Foreign Application Priority Data

Nov. 19, 1997 [DE] Germany ............ 197 51 239

[51] Int. Cl.⁷ .................................. C08F 6/00
[52] U.S. Cl. ................ 528/486; 525/534; 525/537
[58] Field of Search .............. 528/486; 525/534, 525/537

[56] References Cited

U.S. PATENT DOCUMENTS

| | | | |
|---|---|---|---|
| 5,423,902 | 6/1995 | Strutz et al. | 95/273 |
| 5,593,594 | 1/1997 | Strutz et al. | 210/660 |
| 5,670,569 | 9/1997 | Scheckenbach et al. | 524/500 |
| 5,691,427 | 11/1997 | Scheckenbach et al. | 525/537 |
| 5,716,999 | 2/1998 | Frank et al. | 521/77 |
| 5,721,282 | 2/1998 | Schönfeld et al. | 521/51 |
| 5,760,147 | 6/1998 | Schönfeld et al. | 525/535 |
| 5,780,561 | 7/1998 | Scheckenbach et al. | 525/534 |
| 5,786,397 | 7/1998 | Scheckenbach et al. | 521/77 |
| 5,789,452 | 8/1998 | Frank et al. | 521/77 |
| 5,852,139 | 12/1998 | Scheckenbach | 525/537 |

FOREIGN PATENT DOCUMENTS

| | | |
|---|---|---|
| 0827977 A1 | 3/1998 | European Pat. Off. . |
| 1938806 | 2/1970 | Germany . |
| 1365486 | 9/1974 | United Kingdom . |

*Primary Examiner*—Terressa Mosley-Boykin
*Attorney, Agent, or Firm*—Frommer Lawrence & Haug LLP

[57] ABSTRACT

A process for the preparation of polyarylene sulfoxides, in which polyarylene sulfide, suspends in a concentrated acid of formula R—$SO_3H$, in which R is a halogen atom Ian OH group, an aliphatic radical having 1 to 6 C atoms or an aromatic radcal having 6 to 18 C atoms, or of the formula $R^1$—$CR^2R^3$—COOH, in which $R^1$ is a halogen atom and $R^2$ and $R^3$, independently of one another are each a halogen atom, an aliphatic radical having 1 to 50 atoms or a halogenated aliphatic radical having 1 to 5 C atoms, is oxidized by metering in a 30 to 85% strength hydrogen peroxide solution with thorough mixing and at a temperature of from −20 to +45° C. According to this process, the sulfide units of the polyarylene sulfide are converted virtually selectively and completely into sulfoxide units.

11 Claims, No Drawings

OXIDATION OF POLYARYLENE SULFIDES

The invention relates to a process for the preparation of polyarylene sulfoxide by oxidation of polyarylene sulfide.

Polyarylene sulfoxides are special engineering polymers which are used in particular where the polymeric material has to meet high requirements. Thus, polyarylene sulfoxides are moreover distinguished by, for example, high glass transition temperatures, melting points and decomposition temperatures. Potyaryiene sulfoxides are moreover of industrial interest because they can be used as high-temperature blowing agents for the preparation of plastics foams.

In spite of their wide range of advantageous material properties, polyarylene sulfoxides are not yet widely used because the preparation of these polymers is technically complicated and polyarylene sulfoxide is thus relatively expensive.

A known process for the preparation of polyphenylene sulfoxide (PPSO) is the reaction of low molecular weight polyphenylene sulfide (PPS) suspended in acetic anhydride with 70% strength nitric acid (DE-A-1211399/U.S. Pat. No. 332,686). Here, the reaction is carried out over a long period of 24 hours at a temperature between 0 and 5° C.

EP-0623639 describes the oxdation of polyarylene sulfides suspended in an inert medium with ozone, some or all of the sulfide units (—S—) being converted into sulfoxide units (=sulfinyl groups) (—SO—), depending on the amount of oxidizing agent used. However, the handling of the toxic ozone is technically complicated and the process is thus not very economical.

Furthermore, DE-A-1938806 discloses a process in which polyarylene sulfide containing sulifnyl groups, in a medium containing sulfuric acid, is oxidized with oxygenlor an oxygen carrier, for example hydrogen peroxide ($H_2O_2$). In this process, the sulfide units present are converted directly into sulfone units (=sulfonyl groups) (—$SO_2$—).

The oxidation of PPS suspened in concentrated sulfuric acid with $H_2O_2$ is also described in Chimia 28 (1974), pages 567–575 (R. Gabler, J. Studinka: "Neue Polyphenylensulfone—Reaktion an festen Polymeren" [New polyphenylene sulfones—reaction on solid polymers]). Here, it is disclosed that the polyphenylene sulfone (PPSO2) obtained may also contain sulfoxide units, which suggests that the oxidation from PPS to $PPSO_2$ takes place via the formation of sulfoxide units. However, it is also disclosed that the PPSO stage cannot be passed through in this process.

Furthermore, GB-1365486 describes the oxidation of sulfonyl-containing polyarylene sulfide. Here, the polyarylene sulfide sulfone is dissolved in sulfuric acid and oxidized by adding a mixture of hydrogen peroxide and sulfuric acid. According to this process, some of the sulfide units of the polyaryiene sulfide sulfone are also converted into sulfoxide units but it is predominantly the conversion to sulfone units which takes place.

Similarly, EP-A-0623641 discloses that the PPSO stage cannot be isolated in the oxidation of PPS powder with peracetic acid (acetic acid+$H_2O$)—also in the presence of catalytic amounts of sulfuric acid. In this process too, sulfone units are formed at a very early stage so that the product obtained is always a pure polyarylene sulfone or a polyarylene sulfoxide sulfone copolymer in which the number of sulfone units predominates.

EP-A-0791027 discloses a procoss for the oxidation of polyarylene thioethers with the equilibrium system $NO_2$/$N_2O_4$, which leads with high selectivity to the formation of sulfoxide units but, as recent investigations have shown, there is some incorporation of nitro groups on the aromatics.

It was the object of the invention to provide an economical process for the preparation of polyarylene sulfoxides which overcomes the disadvantages of the known processes, especially long reaction times and low selectivity.

This object is achieved by a process in which polyarylene sulfide, suspended in a concentrated acid of the formula R—$SO_3$H, in which R is a halogen atom, an OH group, an aliphatic radical having 1 to 6 C atoms, a halogenated aliphatic radical having 1 to 6 C atoms or an aromatic radical having 6 to 18 C atoms, or of the formula $R^1$—$CR^2R^3$—COOH, in which $R^1$ is a halogen atom and $R^2$ and $R^3$ independently of one another, are each a halogen atom, an aliphatic radical having 1 to 5 C atoms or a halogenated aliphatic radical having 1 to 5 C atoms, is oxidized by metering in a 30 to 100% strength hyd peroxide solution with thorough mixing and at a temperature of from −20 to +45° C.

Surprisingly, it was found that in the process according to the invention, the sulfide units of the polyarylene sulfide are converted virtually selectively, i.e. to a degree of more than 90%, into sulfoxide units and to only a small degree into SUIt ne units. Moreover, it was found that the polyarylene sulfoxide thus obtained has a high decomposition temperature.

In the context of the invention, polyarylene sulfides are linear or branched polymers which contain arylent sulfide units. Preferred polyarylene sulfides are polyarylene thioethers having repeating units of the formula

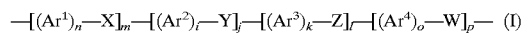

in which $Ar^1$, $Ar^2$, $Ar^3$, $Ar^4$ and W, X, Y and Z, independently of one another, are identical or different, the indices n, m, i, j, k, l, o and p, independently of one another, zero or integers 1, 2, 3 or 4, their sum being at least 2, $Ar^1$, $Ar^2$, $Ar^3$ and $Ar^4$ are arylene systems having 6 to 18 C atoms and W, X, Y and Z, divalent linking groups selected from —$SO_2$—, —S—, —SO—, —CO—, —O—, —COO— or alkylene or alkylidene groups having 1 to 6 C atoms, and at least one of the linking groups W, X, Y or Z comprises —S—.

The arylene systems $Ar^1$, $Ar^2$, $Ar^3$ and $Ar^4$ may alternatively be substituted or unsubstituted. Prefarred arylene systems are phenylinn, biphenylene, naphthylene, anthracene and phenanthrene. A particularly preferred polyarylene sulfide is polyphenylene sulfude, which is known inter alia, by the names ®Fortron and ®Ryton.

In the claimed process, the polarylene sulfide is suspended in an acid of the formula R—$SO_3$H or of the formula $R^1$—$CR^2R^3$—COOH, in which —R may be a halogen atom, an OH group, an aliphatic radical having 1 to 6 C atoms, for example methyl propyl, n-butyl, tert-butyl, pentyl or isopentyl, a halogenated aliphatic radical, such as —$CF_3$, —$CCl_3$ or —$CHCl_2$, or an aromatic radical having 6 to 18 C atoms, for example phenyl, tolyl, biphenyl, naphthyl, anthracenyl or phenanthrenyl, —$R^1$ is a halogen atom, preferably fluorine or chlorine, and —$R^2$ and $R^3$, independently of one another, can each be a halogen atom, preferably fluorine or chlorine an aliphatic radical having 1 to 5, preferably 1 to 3, C atoms, e.g. methyl, ethyl and propyl, or a halogenated aliphatic radical having 1 to 5, preferably 1 to 3, C atoms, e.g. —$CF_3$, —$CCl_3$ and —$CHCl_2$.

Particularly preferred acids are concentrated sulfuric acid, methanesulfonic acid, trifluoromethanesulfonic acid, trichloromethanesulfonic acid, chlorosulfonic acid, trifluoroacetic acid, trichloroacetic acid and dichloroacetic acid. The concentration of this acid is in general from 75 to 100%, preferably from 80 to 96% and particularly preferably from 82.5 to 90%.

For the oxidation of the polyarylene sulfide to the polyarylene sulfoxide, a 30 to 100% strength hydrogen peroxide solution is generally metered as an oxidizing agent into the polyarylene sulfide suspension. The concentration of the hydrogen peroxide solution is preferably from 35 to 85%, particularly preferably from 50 to 85%, Alternatively, the oxidation can also be effected with a mixture of (A) 50 to 100% strength hydrogen peroxide solution and (B) from 95 to 100% strength solution of an acid of the formula R—$SO_3H$ or of the formula $R^1$—$CR^2R^3$—COOH, in which R, $R^1$, $R^2$ and $R^3$ are each one of the substituents defined above and the ratio A:B is from 10:1 to 1:10. Particularly preferred in this case is freshly prepared peroxosulfuric acid, also called Caro's acid, which is prepared from concentrated hydrogen peroxide solution and concentratrated sulfuric acid, or dichloroperacetic acid.

What is essential for the process according to the invention is that the oxidizing agent metered in is distributed as rapidly and thoroughly as possible in the polyarylene sulfide suspension and that the metering is effected at a temperature of from −20 to +45° C., preferably at from 0 to +25° C. and particularly preferably at from 5 to 20° C. The thorough and rapid distribution of the oxidizing agent is in general effected by thorough mixing of the reaction mixture. This can be carried out by generally known methods, for example by using efficient stirrers and flow spoilers, etc. To maintain the specified temperature range, it is advantageous to cool both the oxidizing agent and the polyarylene sulfide suspension and the reaction mixture. Particularly while the oxidizing agent is being metered in, it should be ensured that the temperature does not increase too greatly, in particular not above 45° C.

The oxidizing agent should be added so that from 0.1 to 2 mole equivalents of oxidizing agent are metered in per hour, one mole equivalent being the amount of oxidizing agent which is required to oxidize one mole of sulfide units. The metering is preferably from 0.25 to 1 mole equivalent per hour, particularly preferably from 0.5 to 0.7 mole equivalent per hour.

The molar amount of the oxidizing agent reacted should correspond approximately to the molar amount of sulfide units in the polyarylene sulfide, i.e. the ratio of the molar amount of oxidizing agent to the molar amount of sulfide units should be not more than 1.05:1 when the oxidizing agent is added in excess and not less than 0.98:1 when it is added in less than the stoichiometric amount.

After the end of the metering, the reaction mixture is further mixed thoroughly for a further 0.5 to 5 hours, preferably 0.5 to 3 hours and particularly preferably 1 to 2 hours in order to achieve as complete oxidation of the sulfide units as possible. The temperature is in general kept in the specified range, Preferably, the reaction mixture is kept at constant temperature by cooling.

For working up, the reaction mixture can be diluted with water or ice water and filtered, the polyarylene solfoxide remaining in the filter and the dilute acid being obtained as filtrate Alternatively, this dilute acid, for example from a preceding batch, can also be used for the dilution, The particle size of the product obtained can be influenced by varying the mixing of the reaction mixture during working up, a smaller particle size usually being obtained in the case of better mixing and a lower viscosity of the batch. Particle sizes less than or equal to 70 µm, preferably less than or equal to 50 µm, are usually achieved.

It is in general advantageous if a polyarylene sulfide powder which is as fine-particled as possible is used right at the beginning of the reaction. The particle size of the polyarylen sulfide is in general from 1 to 100 µm, preferably from 5 to 75 µm and particularly preferably from 5 to 45 µm.

In the process according to the invention, in general more than 90%, preferably more than 95%, of the sulfide units are oxidized to sulfoxide units and usually less than 10%, preferably less than 5%, to sulfone units.

The proportion of remaining sulfide units is in general less than 5%, referably less than 2%.

The characteristic d ecompositon stage of the polyarylene sulfoxide obtained by the process according to the invention is as a rule at a temperature from 20 to 25° C. higher in comparison with the products obtained by oxidation in nitric acid. For polyphenylene sulfide oxidized according to the invention, the decomposition stage, determined by means of thermogravimetric analysis (TGA), carried out by heating up in air to 500° C. at 10 K/min, is usually from 365 to 367° C., while PPS oxidized in nitric acid has a decomposition stage at 340° C. When determined by differential scanning calorimetry (DSC) under nitrogen, the decomposition stage is from about 380 to 385° C. according to the invention and from about 365 to 370° C. after oxidation in nitric acid.

The polyarylene sulfoxides prepared by the process according to the invention can be further processed thermoplastically by melt compression methods or by sinter methods depending on the respective glass transition temperature or melting point. In thermoplastic processing, molding materials comprising polyarylene sulfoxide are converted into shaped articles and functional parts by methods customary for thernoplastics, such as injection molding and extrusion. These molding materials may also contain pulverulent fillers such as chalk, talc, clay and mica, fibrous reinforcing materials, such as glass fibers, carbon fibers, metal fibers, polymer fibers or whiskers, and conventional additives and processing assistants, such as antioxidants, lubricants, mold release agents and UV stabilizers.

Shaped articles comprising thermoplastically processible polyarylene sulfoxide are used in particular as high-strength functional components, for example in aircraft construction or automotive construction and in chemical apparatus construction. Shaped articles produced by sinter methods and comprising polyarylene sulfoxide are used in particular where high thermal stability and resistance to chemicals are required. Polyarylene sulfoxides can also be used as fillers and reinforcing materials or as high-temperature chemical blowing agents for other polymers.

For the following examples, a polyphenylene sulfide (PPS, ®Fortron from Ticona GmbH, Frankfurt) having a particle size of 17 µm was used.

EXAMPLES 1–7

Oxidation: $m_{PPS}$ grams (=$n_{PPS}$ mole equivalents) of polyphenylene sulfide (PPS) were suspended in $m_{H2SO4}$ grams of sulfuric acid having a concentration of $x_{H2SO4}$%. The suspension was cooled to $T_{Start}$° C. $m_{H2O2}$ grams (=$n_{H2O2}$ mole equivalents) of an $x_{H2O2}$% strength hydrogen peroxide solution ($H_2O_2$) were then added dropwise while stirring in the course of $t_{Meter}$ minutes, the reaction temperature not exceeding $T_{React}$° C.

After the $H_2O_2$ had been added dropwise, the reaction batch was stirred for a further $t_{React}$ hours while cooling and $t_{After}$ hours at room temperature.

After the end of the reaction, the batches had a more or less intense viscous appearance. The product was present either in virtually completely dissolved form, in partly dissolved form, greatly swollen or only partly swollen form (=consistency in Table 1).

The color of the reaction mixture varied from transparent greenish through turbid greenish to milky dark violet (=color in Table 1).

The sulfuric acid had a concentration of $x_{End}$ % at the end of the reaction.

Working up: the product was precipitated by adding cold water (ice water) to the reaction batch and ispersed for about 30 minutes with an Ultraturrax.

Thereafter, the product was filtered off and was washed neutral with about 10 liters of demineralized water. The polymer dried in a vacuum drying oven at 120° C. was comminuted in a mixer in order to separate aggregated particles from one another.

Analysis: the results of the analysis are summarized in Table 4.

After the end of the reaction, the batches had a more or less intense viscous appearance.

The product was present in partly dissolved form or in more or less swollen form.

TABLE 1

Experimental parameters for Examples 1–7.

| No. | Starting material PPS | | Medium $H_2SO_4$ | | Oxidizing agent $H_2O_2$ | | | Temp. | Time | Temp. | Time | Time | Con- sistency | Color | Conc. |
| --- | --- | --- | --- | --- | --- | --- | --- | --- | --- | --- | --- | --- | --- | --- | --- |
| | $m_{PPS}$ | $n_{PPS}$ | $M_{H2SO4}$ | $X_{H2SO4}$ | $m_{H2O2}$ | $n_{H2O2}$ | $X_{H2O2}$ | $T_{Start}$ | $t_{Meter}$ | $T_{React.}$ | $t_{React.}$ | $t_{After}$ | | | $X_{End}$ |
| 1 | 81 g | 0.75 mol | 974 g | 90.5% | 51.8 g | 0.76 mol | 50% | 10° C. | 120 min | <30° C. | 2 h | — | highly viscous | transparent greenish | 87% |
| 2 | 81 g | 0.75 mol | 974 g | 90.5% | 74.0 g | 0.76 mol | 36% | 10° C. | 180 min | <30° C. | 2 h | — | highly viscous | turbid greenish | 85% |
| 3 | 81 g | 0.75 mol | 1000 g | 88.0% | 73.0 g | 0.75 mol | 35% | 10° C. | 180 min | <25° C. | 2 h | — | viscous | milky dark violet | 83% |
| 4 | 81 g | 0.75 mol | 1000 g | 88.0% | 51.0 g | 0.75 mol | 50% | 10° C. | 120 min | <25° C. | 2 h | — | Viscous | milky dark violet | 85% |
| 5 | 81 g | 0.75 mol | 1001 g | 88.0% | 51.0 g | 0.75 mol | 50% | 10° C. | 120 min | <15° C. | 2 h | — | viscous | milky dark violet | 85% |
| 6 | 81 g | 0.75 mol | 992 g | 89.0% | 51.0 g | 0.75 mol | 50% | 10° C. | 120 min | <15° C. | 1 h | 1 h | viscous | milky dark violet | 86% |
| 7 | 108 g | 1.0 mol | 992 g | 89.0% | 68.0 g | 1.0 mol | 50% | 10° C. | 120 min | <15° C. | 1 h | 1 h | viscous | milky dark violet | 85% |

$m_{PPS}$ = mass of polyphenylene sulfide used; $n_{PPS}$ = mole equivalents of PPS used;
$m_{H2SO4}$ = mass of sulfuric acid used; $X_{H2SO4}$ = concentration of sulfuric acid used;
$m_{H2O2}$ = mass of H2O2 solution used; $n_{H2O2}$ = mole equivalents of $H_2O_2$ used; $X_{H2O2}$ = concentration of the $H_2O_2$ solution used;
$T_{Start}$ = initial temperature to which the PPS/sulfuric acid suspension was cooled;
$t_{Meter}$ = metering time required for adding the $H_2O_2$ solution;
$T_{React.}$ = maximum reaction temperature;
$t_{React.}$ = reaction time at $T_{React.}$; $t_{After}$ = subsequent reaction time at room temperature;
$X_{End}$ = concentration of the reaction medium (sulfuric acid) at the end of the reaction.

EXAMPLES 8–12

Oxidation mpps grams (=$n_{PPS}$ mole equivalents) polyphenylene sulfide (PPS) were suspended in $m_{H2SO}$ grams sulfuric acid having a concentration of $x_{H2SO4}$%.

The suspension was cooled $T_{Start}$ ° C. $m_{Caro}$ grams of Caro's acid, which was freshly prepared from $m_{H2SO4}$ grams of 96% strength sulfuric add and $M_{H2O2}$ grams (=$n_{H2O2}$ mole equivalents) of an 85% strength the hydrogen peroxide solution ($H_2O_2$), were then added dropwise while stirring in the course of $t_{Meter}$ minutes. The reaction temperature did not exceed $T_{React}$ ° C.

After the Caro's acid had been added dropwise, the reaction batch was stirred for a further $t_{React}$ hours while cooling and $t_{After}$ hours at room temperature.

The color of the reaction mixture varied from dark red-brown through rust red to dark pink (=color in Table 2).

At the end of the reaction, the sulfuric acid had a concentration of $X_{End}$%.

Working up: the product was precipitated by adding cold water (ice water) to the reaction batch and was dispersed for about 30 minutes with an Ultraturrax.

Thereafter, the product was filtered off and was washed neutral with about 10 liters of demineralized water. The polymer dried in a vacuum drying oven at 120° C. was comminuted in a mixer in order to separate aggregated particles from one another.

Analysis: the results of the analysis are summarized in Table 4.

TABLE 2

Experimental parameters for Examples 8–12.

| No. | Starting material PPS | | Medium $H_2SO_4$ | | Caro's acid | | | | Temp. | Time | Temp. | Time | Time | Color | Conc. |
| --- | --- | --- | --- | --- | --- | --- | --- | --- | --- | --- | --- | --- | --- | --- | --- |
| | $m_{PPS}$ | $n_{PPS}$ | $M_{H2SO4}$ | $X_{H2SO4}$ | $m'_{H2O2}$ | $+m_{H2O2}$ | $n_{H2O2}$ | $=m_{Caro}$ | $T_{Start}$ | $t_{Meter}$ | $T_{React.}$ | $t_{React.}$ | $t_{After}$ | | $X_{End}$ |
| 8 | 108 g | 1.0 mol | 1010 g | 87.5% | 200 g | 40.0 g | 1.0 mol | 240 g | 10° C. | 120 min | <15° C. | 1 h | 1 h | dark red brown | 87% |
| 9 | 108 g | 1.0 mol | 1028 g | 86.0% | 200 g | 40.0 g | 1.0 mol | 240 g | 10° C. | 120 min | <15° C. | 1 h | 1 h | dark red brown | 85% |
| 10 | 135 g | 1.25 mol | 1190 | 85.0% | 255 g | 50.0 g | 1.25 mol | 305 g | 10° C. | 180 min | <20° C. | 1 h | 1 h | dark pink | 85% |
| 11 | 162 g | 1.5 mol | 1296 g | 82.0% | 306 g | 60.0 g | 1.5 mol | 366 g | 15° C. | 150 min | <20° C. | 1 h | 1 h | dark pink | 83% |
| 12 | 162 g | 1.5 mol | 1296 g | 80.0% | 306 g | 60.0 g | 1.5 mol | 366 g | 15° C. | 150 min | <20° C. | 1 h | 2 h | rust brown | 81% |

$m_{PPS}$ = mass of polyphenylene sulfide used; $n_{PPS}$ = mole equivalents of PPS used;
$m_{H2SO4}$ = mass of sulfuric acid used; $X_{H2SO4}$ = concentration of sulfuric acid used;

TABLE 2-continued

Experimental parameters for Examples 8–12.

| No. | Starting material PPS | | Medium H₂SO₄ | | Caro's acid | | | Temp. $T_{Start}$ | Time $t_{Meter}$ | Temp. $T_{React.}$ | Time $t_{React.}$ | Time $t_{After}$ | Color | Conc. $X_{End}$ |
|---|---|---|---|---|---|---|---|---|---|---|---|---|---|---|
| | $m_{PPS}$ | $n_{PPS}$ | $M_{H2SO4}$ | $X_{H2SO4}$ | $m'_{H2O2}$ | $+m_{H2O2}$ | $n_{H2O2}$ = $m_{Caro}$ | | | | | | | |

$m_{Caro}$ = mass of Caro's acid used, prepared from $m'_{H2SO4}$ = mass of 96% strength sulfuric acid and $m_{H2O2}$ = mass of 85% strength $H_2O_2$ solution; $n_{H2O2}$ = mole equivalents of $H_2O_2$ used;
$T_{Start}$ = initial temperature to which the PPS/sulfuric acid suspension was cooled;
$t_{Meter}$ = metering time required for adding the $H_2O_2$ solution;
$T_{React.}$ = maximum reaction temperature;
$t_{React.}$ = reaction time at $T_{React}$; $t_{After}$ = subsequent reaction time at room temperature;
$X_{End}$ = concentration of the reaction medium (sulfuric acid) at the end of the reaction.

EXAMPLES 13–16

Oxidation: $m_{PPS}$ grams (=$n_{PPS}$ mole equivalents) of polyphenylene sulfide (PPS) were suspended in $m_{DCA}$ grams of dichloroacetic acid (DCA) having a concentration of $x_{DCA}$ %.

The suspension was cooled to $T_{Start}$ ° C.

$m_{H2O2}$ grams (=$n_{H2O2}$ mole equivalents) of an $x_{H2O2}$% strength hydrogen peroxide solution ($H_2O_2$) were then added dropwise while stirring in the course of $T_{Meter}$, minutes the reaction temperature not exceeding $T_{React}$, ° C. After the $H_2O_2$ had been added dropwise, the reaction batch was stirred for a further $t_{React}$, hours while cooling and $t_{After}$ hours at room temperature.

After the end of the reaction the batches had a more or less intense viscous appearance. The product was present either in virtually completely dissolved form, in partly dissolved form or only in swollen form (=consistency in Table 3).

The color of the reaction mixture varied from turbid colorless to milky white (=color in Table 3).

At the end of the reaction, the dichloroacetic acid had a concentration of $X_{End}$ %.

Working up: the product was precipitated by adding hot water (60–70° C.) to the reaction batch and was dispersed for about 30 minutes with an Ultraturrax.

Thereafter, the product was filtered off and was washed neutral with about 5 liters of demineralized water. The polymer dried in a vacuum drying oven at 120° C. was comminuted in a mixer in order to separate aggregated particles from one another.

Analysis: the results of the analysis are summarized in Table 4.

TABLE 3

Experimental parameters for Examples 13–16.

| No. | Starting material PPS | | Medium DCA | | Oxidizing agent H₂O₂ | | | Temp. $T_{Start}$ | Time $t_{Meter}$ | Temp. $T_{React.}$ | Time $t_{React.}$ | Time $t_{After}$ | Con- sistency | Color | Conc. $X_{End}$ |
|---|---|---|---|---|---|---|---|---|---|---|---|---|---|---|---|
| | $m_{PPS}$ | $n_{PPS}$ | $M_{DCA}$ | $X_{DCA}$ | $m_{H2O2}$ | $n_{H2O2}$ | $X_{H2O2}$ | | | | | | | | |
| 13 | 54 g | 0.50 mol | 770 g | 99.5% | 34.0 g | 0.50 mol | 50% | 5° C. | 45 min | <10° C. | 2 h | 1 h | highly viscous, virtually dissolved | colorless, slightly turbid | 95% |
| 14 | 54 g | 0.50 mol | 810 g | 95.0% | 34.0 g | 0.50 mol | 50% | 5° C. | 60 min | <10° C. | 2 h | 1 h | viscous, partly dissolved | milky turbid | 91% |
| 15 | 54 g | 0.50 mol | 830 g | 92.8% | 34.0 g | 0.50 mol | 50% | 5° C. | 60 min | <10° C. | 2 h | 1 h | viscous, greatly swollen | milky white | 89% |
| 16 | 54 g | 0.50 mol | 850 g | 90.5% | 34.0 g | 0.50 mol | 50% | 5° C. | 60 min | <10° C. | 2 h | 1 h | suspension slightly swollen | white | 87% |

$m_{PPS}$ = mass of polyphenylene sulfide used; $n_{PPS}$ = mole equivalents of PPS used;
$m_{DCA}$ = mass of dichloroacetic acid used; $X_{DCA}$ = concentration of the dichloroacetic acid used;
$m_{H2O2}$ = mass of $H_2O_2$ solution used; $n_{H2O2}$ = mole equivalents of H2O2 used; $X_{H2O2}$ = concentration of the $H_2O_2$ solution used,
$T_{Start}$ = initial temperature to which the PPS/DCA suspension was cooled;
$t_{Meter}$ = metering time required for adding the $H_2O_2$ solution;
$T_{React.}$ = maximum reaction temperature;
$t_{React.}$ = reaction time $T_{React}$; $t_{After}$ = subsequent reaction time at room temperature;
$X_{End}$ - concentration of the reaction medium (dichloroacetic acid) at the end of the reaction.

TABLE 4

¹H NMR analysis of the polyarylene sulfoxides from Examples 1–16
(Solutions in deutero-dichloroacetic acid = $D_2$-DCA).

| Product | Sulfide units S in [%] | Sulfoxide units SO in [%] | Sulfone units $SO_2$ in [%] | Degree of oxidation in [%] |
|---|---|---|---|---|
| Example 1 | 1.3 | 96.1 | 2.6 | 101.3 |

TABLE 4-continued

¹H NMR analysis of the polyarylene sulfoxides from Examples 1–16
(Solutions in deutero-dichloroacetic acid = $D_2$-DCA).

| Product | Sulfide units S in [%] | Sulfoxide units SO in [%] | Sulfone units $SO_2$ in [%] | Degree of oxidation in [%] |
|---|---|---|---|---|
| Example 2 | 1.0 | 95.9 | 3.1 | 102.1 |
| Example 3 | 0.9 | 96.2 | 2.9 | 102.0 |
| Example 4 | 0.8 | 96.5 | 2.7 | 101.9 |
| Example 5 | 1.2 | 96.3 | 2.5 | 101.3 |
| Example 6 | 1.0 | 96.6 | 2.4 | 101.4 |
| Example 7 | 1.1 | 94.7 | 4.2 | 103.1 |
| Example 8 | 1.5 | 96.2 | 2.3 | 100.8 |
| Example 9 | 1.5 | 95.9 | 2.6 | 101.0 |
| Example 10 | 1.0 | 95.4 | 3.6 | 102.6 |
| Example 11 | 1.0 | 94.8 | 4.2 | 103.2 |
| Example 12 | 1.4 | 93.3 | 5.3 | 103.9 |
| Example 13 | 1.2 | 97.9 | 0.9 | 99.7 |
| Example 14 | 1.1 | 96.9 | 2.0 | 100.9 |
| Example 15 | 1.0 | 95.5 | 3.5 | 102.5 |
| Example 16 | 2.5 | 93.2 | 4.3 | 101.8 |

Degree of oxidation: pure PPSO = 100%.

We claim:

1. A process for the preparation of polyarylene sulfoxide, in which polyarylene sulfide, suspended in a concentrated acid of the formula R—$SO_3H$ or of the formula $R^1$—$CR^2R^3$—COOH, in which R is a halogen atom, an OH group, an aliphatic radical having 1 to 6 C atoms, a halogenated aliphatic radical having 1 to 6 C atoms or an aromatic radical having 6 to 18 C atoms, $R^1$ is a halogen atom and $R^2$ and $R^3$, independently of one another, are each a halogen atom, an aliphatic radical having 1 to 5 C atoms or a halogenated aliphatic radical having 1 to 5 C atoms, is oxidized by metering in a 30 to 100% strength hydrogen peroxide solution with thorough mixing and at a temperature of from −20 to +45° C.

2. The process as claimed in claim 1, wherein the molar amount of the hydrogen peroxide solution reacted corresponds approximately to the molar amount of sulfide units in the polyarylene sulfide.

3. The process as claimed in claim 1, wherein an acid of the formula R—$SO_3H$ in the form of concentrated sulfuric acid, methanesulfonic acid, trifluoromethanesulfonic acid, trichloromethanesulfonic acid or chlorosulfonic acid is used.

4. The process as claimed in claim 1, wherein an acid of the formula $R^1$—$CR^2R^3$—COOH in the form of concentrated trifluoroacetic acid, trichloroacetic acid or dichloroacetic acid is used.

5. The process as claimed in claim 1, wherein the concentration of the acid of the formula R—$SO_3H$ or of the formula $R^1$—$CR^2R^3$—COOH is 75 to 100%.

6. The process as claimed in claim 1, wherein the polyarylene sulfide used is linear or branched polyarylene thioether having repeating units of the formula $$\text{—}[(Ar^1)_n\text{—}X]_m\text{—}[(Ar^2)_i\text{—}Y]_j\text{—}[(Ar^3)_k\text{—}Z]_l\text{—}[(Ar^4)_o\text{—}W]_p\text{—} \quad (I)$$

in which $Ar^1$, $Ar^2$, $Ar^3$, $Ar^4$ and W, X, Y and Z, independently of one another, are identical or different, the indices n, m, i, j, k, l, o and p, independently of one another, are zero or integers 1, 2, 3 or 4, their sum being at least 2, $Ar^1$, $Ar^2$, $Ar_3$ and $Ar^4$ are arylene systems having 6 to 18 C atoms and W, X, Y and Z are divalent linking groups selected from —$SO_2$—, —S—, —SO—, —CO—, -O—, —COO— or alkylene or alkylidene groups having 1 to 6 C atoms, and at least one of the linking groups W, X, Y or Z comprises —S—.

7. The process as claimed in claim 6, wherein the polyarylene sulfide used is polyphenylene sulfide.

8. The process as claimed in claim 1, wherein the particle size of the polyarylene sulfide is from 1 to 100 μm.

9. The process as claimed in claim 1, wherein the metering of the hydrogen peroxide solution is from 0.1 to 2 mole equivalents per hour.

10. The process as claimed in claim 1, wherein, after the hydrogen peroxide solution has been metered in, the reaction mixture is further mixed thoroughly for a period of from 0.5 to 5 hours at a temperature of from −20 to +45° C.

11. The process as claimed in claim 1, wherein, instead of the hydrogen peroxide solution, a mixture comprising (A) a 50 to 100% strength hydrogen peroxide solution and (B) a 95 to 100% strength acid of the formula R—$SO_3H$ or of the formula $R^1$—$CR^2R^3$—COOH, in which R is a halogen atom, an OH group, an aliphatic radical having 1 to 6 C atoms, a halogenated aliphatic radical having 1 to 6 C atoms or an aromatic radical having 6 to 18 C atoms, $R^1$ is a halogen atom and $R^2$ and $R^3$, independently of one another, are each a halogen atom, an aliphatic radical having 1 to 5 C atoms or a halogenated aliphatic radical having 1 to 5 C atoms, is metered in for oxidzing the polyarylene sulfide, the ratio A:B being from 10:1 to 1,10.

* * * * *